(12) United States Patent
Machida et al.

(10) Patent No.: US 12,219,202 B2
(45) Date of Patent: Feb. 4, 2025

(54) MULTIMEDIA PLAYER DISPLAYING OPERATION PANEL DEPENDING ON CONTENTS

(71) Applicant: MAXELL, LTD., Kyoto (JP)

(72) Inventors: Yoshihiro Machida, Yokohama (JP); Nobuhiro Tsutsumi, Yokohama (JP); Kouji Kamogawa, Yokohama (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 18/604,771

(22) Filed: Mar. 14, 2024

(65) Prior Publication Data

US 2024/0223841 A1 Jul. 4, 2024

Related U.S. Application Data

(63) Continuation of application No. 18/138,178, filed on Apr. 24, 2023, now Pat. No. 11,974,007, which is a (Continued)

(30) Foreign Application Priority Data

Aug. 30, 2005 (JP) .................................. 2005-248576

(51) Int. Cl.
*H04N 21/431* (2011.01)
*G06F 3/0481* (2022.01)
(Continued)

(52) U.S. Cl.
CPC ....... *H04N 21/4312* (2013.01); *G06F 3/0481* (2013.01); *G11B 19/025* (2013.01);
(Continued)

(58) Field of Classification Search
None
See application file for complete search history.

(56) References Cited

U.S. PATENT DOCUMENTS 4,746,919 A 5/1988 Reitmeier
4,825,209 A 4/1989 Sasaki et al.
(Continued)

FOREIGN PATENT DOCUMENTS

CA 2482234 A1 11/2003
EP 1376321 1/2004
(Continued)

OTHER PUBLICATIONS

Machine generated translation of JP 2005-006144 to Suda et al. Jun. 2005.
(Continued)

*Primary Examiner* — Daniel T Tekle
(74) *Attorney, Agent, or Firm* — Mattingly & Malur, PC (57) ABSTRACT

A digital content operating apparatus, including: a communication unit which communicates with an external device which has a display for displaying the digital content; a user operation interface which receives a user operation to control the digital content which is displayed on the external device; a display which displays either a linear content operation panel or an interactive content operation panel; and a controller which controls the user operation interface corresponding to information on the digital content which is displayed on the external device; wherein either the linear content operation panel or the interactive content operation panel is displayed alternatively as the user operation interface on the display.

18 Claims, 11 Drawing Sheets

Related U.S. Application Data continuation of application No. 17/868,139, filed on Jul. 19, 2022, now Pat. No. 11,812,091, which is a continuation of application No. 15/670,155, filed on Aug. 7, 2017, now Pat. No. 11,470,379, which is a continuation of application No. 15/287,074, filed on Oct. 6, 2016, now Pat. No. 9,743,129, which is a continuation of application No. 13/443,955, filed on Apr. 11, 2012, now Pat. No. 9,489,985, which is a continuation of application No. 11/508,209, filed on Aug. 23, 2006, now Pat. No. 8,170,394.

(51) Int. Cl.
| | | |
|---|---|---|
| *G11B 19/02* | (2006.01) | |
| *G11B 27/30* | (2006.01) | |
| *G11B 27/34* | (2006.01) | |
| *G11B 27/36* | (2006.01) | |
| *H04N 21/41* | (2011.01) | |
| *H04N 21/426* | (2011.01) | |
| *H04N 21/434* | (2011.01) | |
| *H04N 21/466* | (2011.01) | |
| *H04N 21/472* | (2011.01) | |
| *G06F 3/04847* | (2022.01) | |
| *G06F 3/04886* | (2022.01) | |

(52) U.S. Cl.
CPC .......... *G11B 27/3027* (2013.01); *G11B 27/34* (2013.01); *G11B 27/36* (2013.01); *H04N 21/4122* (2013.01); *H04N 21/4263* (2013.01); *H04N 21/434* (2013.01); *H04N 21/4345* (2013.01); *H04N 21/466* (2013.01); *H04N 21/47217* (2013.01); *G06F 3/04847* (2013.01); *G06F 3/04886* (2013.01); *G06F 2203/04803* (2013.01)

(56) References Cited

U.S. PATENT DOCUMENTS

| | | | |
|---|---|---|---|
| 5,315,999 A | 5/1994 | Kinicki et al. | |
| 5,367,316 A | 11/1994 | Ikezaki | |
| 5,416,535 A * | 5/1995 | Sato | H04B 1/202 |
| | | | 348/E5.103 |
| 5,428,730 A | 6/1995 | Baker et al. | |
| 5,517,257 A | 5/1996 | Dunn et al. | |
| 5,606,374 A | 2/1997 | Bertram | |
| 5,648,824 A | 7/1997 | Dunn et al. | |
| 5,721,829 A | 2/1998 | Dunn | |
| 5,801,747 A * | 9/1998 | Bedard | H04N 21/812 |
| | | | 725/13 |
| 5,809,204 A | 9/1998 | Young et al. | |
| 5,831,664 A | 11/1998 | Wharton et al. | |
| 5,850,218 A | 12/1998 | LaJoie | |
| 5,914,941 A | 6/1999 | Janky | |
| 5,929,850 A | 7/1999 | Broadwin et al. | |
| 6,025,869 A * | 2/2000 | Stas | H04N 21/4314 |
| | | | 725/27 |
| 6,055,413 A | 4/2000 | Morse | |
| 6,100,883 A | 8/2000 | Hoarty | |
| 6,141,003 A | 10/2000 | Chor | |
| 6,154,771 A | 11/2000 | Rangan et al. | |
| 6,177,931 B1 | 1/2001 | Alexander et al. | |
| 6,233,389 B1 | 5/2001 | Barton et al. | |
| 6,240,555 B1 | 5/2001 | Shoff et al. | |
| 6,297,856 B1 | 10/2001 | Nakamura et al. | |
| 6,348,932 B1 | 2/2002 | Nishikawa | |
| 6,378,130 B1 | 4/2002 | Adams | |
| 6,392,664 B1 | 5/2002 | White | |
| 6,404,418 B1 | 6/2002 | Leem | |
| 6,407,779 B1 | 6/2002 | Herz | |
| 6,446,040 B1 | 9/2002 | Socher | |
| 6,493,038 B1 | 12/2002 | Singh et al. | |
| 6,603,488 B2 | 8/2003 | Humpleman | |
| 6,609,253 B1 | 8/2003 | Swix et al. | |
| 6,628,302 B2 | 9/2003 | White et al. | |
| 6,636,157 B1 | 10/2003 | Sato | |
| 6,678,891 B1 | 1/2004 | Wilcox et al. | |
| 6,690,431 B1 | 2/2004 | Yang et al. | |
| 6,732,367 B1 * | 5/2004 | Ellis | H04N 21/84 |
| | | | 725/27 |
| 6,757,907 B1 | 6/2004 | Schumacher et al. | |
| 6,804,825 B1 | 10/2004 | White et al. | |
| 6,930,730 B2 | 8/2005 | Maxon | |
| 6,976,216 B1 | 12/2005 | Peskin et al. | |
| 6,993,722 B1 | 1/2006 | Greer | |
| 7,043,477 B2 | 5/2006 | Mercer et al. | |
| 7,071,865 B2 | 7/2006 | Shibamiya et al. | |
| 7,073,189 B2 | 7/2006 | McElhatten et al. | |
| 7,126,587 B2 | 10/2006 | Kawakami et al. | |
| 7,155,674 B2 | 12/2006 | Breen et al. | |
| 7,174,518 B2 | 2/2007 | Kim | |
| 7,194,701 B2 | 3/2007 | Stavely et al. | |
| 7,257,775 B1 | 8/2007 | Jivakov et al. | |
| 7,293,276 B2 | 11/2007 | Phillips et al. | |
| 7,365,782 B2 | 4/2008 | Tanaka et al. | |
| 7,392,532 B2 | 6/2008 | White et al. | |
| 7,475,349 B2 | 1/2009 | Wagner et al. | |
| 7,522,087 B2 | 4/2009 | Shibamiya et al. | |
| 7,523,478 B2 | 4/2009 | Blackketter et al. | |
| 7,536,647 B2 | 5/2009 | Walker et al. | |
| 7,546,537 B2 | 6/2009 | Crawford | |
| 7,590,997 B2 | 9/2009 | DiazPerez | |
| 7,595,846 B2 | 9/2009 | Moon | |
| 7,650,621 B2 | 1/2010 | Thomas et al. | |
| 7,667,123 B2 | 2/2010 | Phillips et al. | |
| 7,673,250 B2 | 3/2010 | Taylor | |
| 7,797,718 B2 | 9/2010 | Stecyk | |
| 7,899,915 B2 | 3/2011 | Reisman | |
| 7,917,933 B2 | 3/2011 | Thomas et al. | |
| 8,068,718 B2 | 11/2011 | Hamasaka et al. | |
| 8,086,093 B2 | 12/2011 | Stuckman | |
| 8,112,711 B2 | 2/2012 | Ackley | |
| 8,151,210 B2 | 4/2012 | Nezu et al. | |
| 8,170,394 B2 | 5/2012 | Machida et al. | |
| 8,181,205 B2 | 5/2012 | Russ et al. | |
| 8,245,250 B2 * | 8/2012 | Casement | H04N 21/4751 |
| | | | 725/50 |
| 8,352,986 B2 | 1/2013 | Uchida | |
| 8,402,505 B2 | 3/2013 | Alten | |
| 8,418,202 B2 | 4/2013 | Ahmad-Taylor | |
| 8,516,520 B1 | 8/2013 | Look et al. | |
| 8,601,514 B1 | 12/2013 | Kellum et al. | |
| 8,707,354 B1 | 4/2014 | Moreau et al. | |
| 8,773,360 B2 | 7/2014 | Uchida et al. | |
| 9,065,979 B2 | 6/2015 | Cohen et al. | |
| 9,489,985 B2 | 11/2016 | Machida | |
| 2002/0021306 A1 | 2/2002 | Gehrke et al. | |
| 2002/0054028 A1 | 5/2002 | Uchida et al. | |
| 2002/0059586 A1 | 5/2002 | Carney et al. | |
| 2002/0060750 A1 | 5/2002 | Istvan et al. | |
| 2002/0065927 A1 | 5/2002 | Janik et al. | |
| 2002/0132216 A1 | 9/2002 | Dohrmann | |
| 2002/0162117 A1 | 10/2002 | Pearson et al. | |
| 2003/0037068 A1 | 2/2003 | Thomas | |
| 2003/0050885 A1 | 3/2003 | Cohen et al. | |
| 2003/0113100 A1 | 6/2003 | Hecht | |
| 2003/0147635 A1 | 8/2003 | Jung et al. | |
| 2003/0149988 A1 | 8/2003 | Ellis | |
| 2003/0163811 A1 | 8/2003 | Luehrs | |
| 2003/0214604 A1 | 11/2003 | Lee | |
| 2003/0234805 A1 | 12/2003 | Toyama et al. | |
| 2004/0001703 A1 | 1/2004 | Kang | |
| 2004/0028375 A1 | 2/2004 | Kim et al. | |
| 2004/0040041 A1 | 2/2004 | Crawford | |
| 2004/0047588 A1 | 3/2004 | Okada | |
| 2004/0059790 A1 | 3/2004 | Austin-Lane | |
| 2004/0060063 A1 | 3/2004 | Russ | |
| 2004/0063479 A1 | 4/2004 | Kimura | |
| 2004/0075670 A1 | 4/2004 | Bezine et al. | |
| 2004/0103434 A1 | 5/2004 | Ellis | |
| 2004/0117831 A1 | 6/2004 | Ellis | |

(56) References Cited

U.S. PATENT DOCUMENTS

| | | |
|---|---|---|
| 2004/0131335 A1 | 7/2004 | Halgas et al. |
| 2004/0133923 A1 | 7/2004 | Watson et al. |
| 2004/0154040 A1 | 8/2004 | Ellis |
| 2004/0194139 A1 | 9/2004 | Rao et al. |
| 2004/0249925 A1 | 12/2004 | Jeon |
| 2005/0024341 A1 | 2/2005 | Gillespie et al. |
| 2005/0028204 A1 | 2/2005 | Nakamura et al. |
| 2005/0053356 A1 | 3/2005 | Mate et al. |
| 2005/0097600 A1 | 5/2005 | Heer |
| 2005/0132420 A1 | 6/2005 | Howard et al. |
| 2005/0134746 A1 | 6/2005 | Brandt |
| 2005/0160458 A1 | 7/2005 | Baumgartner |
| 2005/0160461 A1 | 7/2005 | Baumgartner et al. |
| 2005/0160465 A1 | 7/2005 | Walker |
| 2005/0166230 A1* | 7/2005 | Gaydou ............... G11B 27/105 348/E7.071 |
| 2005/0172332 A1 | 8/2005 | Fukuda |
| 2005/0188408 A1 | 8/2005 | Wallis et al. |
| 2005/0198663 A1 | 9/2005 | Chaney |
| 2005/0240961 A1 | 10/2005 | Jerding |
| 2005/0262535 A1 | 11/2005 | Uchida et al. |
| 2005/0267676 A1 | 12/2005 | Nezu et al. |
| 2006/0010099 A1 | 1/2006 | Takeda et al. |
| 2006/0015911 A1 | 1/2006 | Dean |
| 2006/0020969 A1 | 1/2006 | Utsuki |
| 2006/0020982 A1 | 1/2006 | Jerding |
| 2006/0041655 A1* | 2/2006 | Holloway ........ H04N 21/42224 709/223 |
| 2006/0050059 A1 | 3/2006 | Satoh |
| 2006/0161954 A1 | 7/2006 | Hamada et al. |
| 2006/0242106 A1 | 10/2006 | Bank |
| 2006/0256241 A1 | 11/2006 | Suzuki |
| 2006/0271971 A1 | 11/2006 | Drazin |
| 2007/0003220 A1 | 1/2007 | Hamasaka et al. |
| 2007/0044015 A1 | 2/2007 | Ikeda |
| 2007/0106945 A1 | 5/2007 | Kim |
| 2007/0124765 A1 | 5/2007 | Bennett et al. |
| 2007/0185968 A1 | 8/2007 | White et al. |
| 2008/0184297 A1 | 7/2008 | Ellis et al. |
| 2011/0061078 A1 | 3/2011 | Rothschild |
| 2012/0227075 A1 | 9/2012 | Asmussen |

FOREIGN PATENT DOCUMENTS

| | | |
|---|---|---|
| GB | 2535309 A | 8/2016 |
| JP | 08079647 | 3/1996 |
| JP | 09168131 | 6/1997 |
| JP | 11298822 | 10/1999 |
| JP | 2000-206949 A | 7/2000 |
| JP | 2000287159 | 10/2000 |
| JP | 2003-209710 A | 7/2003 |
| JP | 2005006144 | 1/2005 |
| JP | 2005073022 | 3/2005 |
| WO | 9844732 | 10/1998 |
| WO | 0133344 A2 | 5/2001 |
| WO | 03/026275 A2 | 3/2003 |
| WO | 2005024828 | 3/2005 |
| WO | 2005/065166 A2 | 7/2005 |

OTHER PUBLICATIONS

*Motorola Mobility LLC* v. *Maxell, Ltd.*, Petition for Inter Partes Review of U.S. Pat. No. 8,170,394, Inter Partes Review No. IPR2022-01348 filed Aug. 18, 2022.
Myers, B. A., "A Taxonomy of Window Manager User Interfaces", IEEE Computer Graphics & Applications, Sep. 1988, pp. 65-84.
Press, L., "Personal Computing: Compuvision or Teleputer?", Communication of the ACM, Sep. 1990, pp. 29-36, vol. 33, No. 9.
"ARIB Technical Report TR-B14 Version 2.8", Association of Radio Industries and Businesses, May 29, 2006, pp. 1-564, vol. 3.
*Blackberry Corporation* v. *Maxell, Ltd.*, Petition for Inter Partes Review of U.S. Pat. No. 8,170,394, Inter Partes Review No. IPR2019-00089, Mar. 29, 2019.
Excerpts from File History of U.S. Pat. No. 8,170,394.
Excerpts from Sony's Digital Dreams Publication, 1999.
Excerpts from Apple's Macintosh Human Interface Guidelines, 1992.
Overview and Amendment History of Amendment History of ARIB Technical Report TRB14, 2018.
Khan, J. et al., "Bluetooth-Based Wireless Personal Area Network for Multimedia Communication", Proceedings of the First IEEE International Workshop on Electronic Design, 2002.
Ahmad, M. et al., "Multimedia Transmission over Interworking of Bluetooth WPAN and IEEE 802.11g WLAN Networks", 2005, pp. 380-383.
Vilovic, I. et al., "Performance of the Bluetooth-Based WPAN for Multimedia Communication", 4th EURASiP Conference focused on Video/Image Processing and Multimedia Communication, Jul. 2-5, 2003, pp. 783-788.
"Linksys Wireless A/G USB Network Adapter User Guide", Cisco Systems, 2004, pp. 1-45.
"User Guide Wireless-G USB Network Adapter Model: WUSB54G", Cisco Systems, 2007, pp. 1-37.
"Wireless-G USB Network Adapter Quick Installation Model: WUSB54G", Cisco Systems, 2004.
"ANSI/IEEE Std 802.11, Part 11: Wireless LAN Medium Access Control (MAC) and Physical Layer (PHY) Specifications", LAN MAN Standards Committee of the IEEE Computer Society, 1999, pp. 1-512.
"ANSI/IEEE Std 802.11a, Part 11: Wireless LAN Medium Access Control (MAC) and Physical Layer (PHY) specifications: High-speed Physical Layer in the 5 GHZ Band", LAN MAN Standards Committee of the IEEE Computer Society, 1999, pp. 1-82.
"Nokia Eseries—Nokia E90 Communicator User Guide", Nokia, 2007, pp. 1-93.
"HP MediaSmart HDTV User's Guide", HP Invent, 2006, pp. 1-92.
"Transmission of Non-Telephone Signals Information Technology—Generic Coding of Moving Pictures and Associated Audio Information: Systems", International Telecommunication Union, 1995, pp. 1-119.
Lindblad, C. J. et al., "ViewStation Applications Implications for Network Traffic", IEEE Journal on Selected Areas in Communications, vol. 13, No. 5, Jun. 1995, pp. 768-778.
Lindblad, C. J. et al., "The VuSystem: A Programming System for Compute-Intensive Multimedia", IEEE Journal on Selected Areas in Communications, 1996, pp. 1-19.
Lindblad, C. J. et al., "ViewStation Applications: Intelligent Video Processing Over a Broadband Local Area Network", 1994.
Wong, D. et al., "Soft Handoffs in CDMA Mobile Systems", IEEE Personal Communications, Dec. 1997.
Lupo, G. et al., "Dynamic Resource Allocation with a Soft Handover Procedure for Application in a Broadband System", IEEE, 1999, pp. 2111-2115.
Forsberg, D. et al., "Increasing communication availability with signalbased mobile controlled handoffs" IP based Cellular Networks Conference IPCN, 2000.
Kim, S. H. et al., "Soft QOS-Based Vertical Handover Scheme for WLAN and WCDMA Networks Using Dynamic Programming Approach", Jan. 2002, pp. 1-5.
Beyah, R. A. et al., "A Mobility Enhancement for Switched Wireless Ethernet for Soft Handoff", 2002.
"Fujitsu 5906i comes with AuthenTec/TruNav: iPhone Competitor, Smart in Technology", Aug. 2008.
"ARIB Technical Report TR-B14", 2006.
"Microsoft Press Computer Dictionary, 3rd Ed.", Microsoft, 1997.
Rong, L. et al., "Application Level Session Hand-Off Management in a Ubiquitous Multimedia Environment", 2004, pp. 223-229.
Komiya, D. et al., "Use Cases for Session Mobility in Multimedia Applications", Matsushita Electric (Panasonic), Feb. 2006.
Mate, S. et al., "Movable-Multimedia: Session Mobility in Ubiquitous Computing Ecosystem", 2006.
Bovik, A., "Handbook of Image & Video Processing (2nd Ed.)", 2005.
Bovik, A., "Handbook of Image & Video Processing (1st Ed.)", 2000.

(56) References Cited

OTHER PUBLICATIONS

"Real Player Plus Real Player 8 Plus User Manual", Real Networks, 2000, pp. 1-106.
Per Johansson, "Bluetooth: An Enabler for Personal Area Networking", Ericsson Research, 2001.
"Mobile and Wireless Design Essentials", Martyn Mallick, John Wiley & Sons, 2003, pp. 1-352.
Busatto, F., "TCP Keepalive HOWTO Revision 1.0", May 4, 2007, pp. 1-11.
"Transmission Control Protocol", RFC 793, Sep. 1981.
Newton, H., "Newton's Telecom Dictionary", 2004.
Apostolopoulos et al., "Video Streaming: Concepts, Algorithms, and Systems", 2002, pp. 1-34.
Ribas-Corbera, J. et al., "A Flexible Decoder Buffer Model for JVT Video Coding", 2002, pp. 493-496.
Sheu, T. et al., "A Buffer Allocation Mechanism for VBR Video Playback", 2000, pp. 1641-1644.
Cui, Y. et al., "Seamless User-Level Handoff in Ubiquitous Multimedia Service Delivery", 2004, pp. 137-170.
Bederson, B., "PhotoMesa: A Zoomable Image Browser Using Quantum Treemaps and Bubblemaps", 2001, pp. 71-80.
Ethington, B., "Introducing Microsoft Windows 95" with authenticating declaration of Carmen Debord, 1995.
Furnas, G. W. et al., "Multitrees: Enriching and Reusing Hierarchical Structure" with authenticating declaration of Scott Delman, 1994, pp. 330-336.
"Microsoft Computer Dictionary, 4th Ed.", Microsoft, 1999.
Cohoon, J. P. et al., "C++ Program Design: An Introduction to Programming and Object-Oriented Design, 3rd Ed.", 2002.
*Vizio, Inc. v. Maxell, Ltd.*, Petition for Inter Partes Review of U.S. Pat. No. 8,170,394, Inter Partes Review No. IPR2023-00316 filed Mar. 3, 2023, pp. 1-86.
Certain Mobile Electronic Devices' Respondents' Initial Invalidity Contentions which were filed in the following Investigation No. 337-TA-1324 (Washington, D.C.), filed Dec. 7, 2022, pp. 1-93.
Certain Mobile Electronic Devices' Expert Report of Benjamin B. Bederson, PH.D., Regarding Invalidity of U.S. Pat. No. 8, 17,394 which was filed in the following Investigation No. 337-TA-1324 (Washington, D.C.), executed Feb. 3, 2023, pp. 1-165.
Certain Mobile Electronic Devices' Respondents' Supplemental Invalidity Contentions which were filed in the following Investigation No. 337-TA-1324 (Washington, D.C.), filed Jan. 17, 2023, pp. 1-101.
"EchoStar and WebTV Networks Deliver Digital Video Recording for Satellite TV Customers", Dish Press Releases, Dec. 14, 1999, pp. 1-5.
"Facts about the Hughes HDVR2 of DIRECTV", http://tivopedia.com/model-hughes-hdvr2.php, Copyright 2009-2022, pp. 1-3.
"Comcast Launches HDTV", Corporate Comcast, URL: https://corporate.comcast.com/news-information/news-feed/comcast-launches-hdtv, Oct. 29, 2001, pp. 1-3.
Lu, K. Y., "Interaction Design Principles for Interactive Television", In Partial Fulfillment of the Requirements for the Degree Master of Science in Information Design and Technology, May 2005, pp. 1-202.
"Toshiba Digital Media Server SD-H400 Installation Guide", Copyright 2003, pp. 1-151.
Falcone, J., Pioneer DVR-810H (80-hour TiVo) review: Pioneer DVR-810H (80-hour TiVo), https://cnet.com/reviews/pioneer-dvr-810h-80-hour-tivo-review/, Jun. 10, 2004, pp. 1-7.
"Comcast and TiVo Announce Strategic Partnership", Corporate Comcast, URL: https://corporate.comcast.com/news-information/news-feed/comcast-and-tivo-announce-strategic-partnership, Mar. 15, 2005, pp. 1-4.
"Facts about the TiVo TCD230040", https://tivopedia.com/model-att-tcd230040.php, Copyright 2009-2022, pp. 1-3.
"Philips AOL TV Internet TV" Philips Manual, URL: https://www.download.p4c.philips.com/files/w/wvh111_17/wvh111_17_pss_aenus.pdf, pp. 1-2, Copyright 2000.
"W VH 111 User Manual AOL TV", AOL TV, Copyright 2000, pp. 1-35.
"Communication Technology", Official Trade Journal of the Society of Cable Telecommunications Engineers, Jun. 1999, pp. 1-158.
Angwin, J., "AOL Launches Set-Top Boxes That Let Users Chat Online While Watching Tv", WSJ, URL: https://www.wsj.com/articles/SB961362519698697717, Jun. 19, 2000, pp. 1-3.
"TiVo DVR User's Guide", Copyright 2004, pp. 1-180.
"WebTV Networks Takes the Lead in Personal TV Services", Microsoft, Jan. 6, 2000, pp. 1-6.
Pelline, J., "Time Warner to Shutter ITV Effort", CNET, May 1, 1997, pp. 1-2.
Jackson, K., "Netflix, Disney Plus, HBO Max: Save on Streaming with One Clever Trick", CNET, Aug. 13, 2022, pp. 1-4.
"Comcast Enhances On Demand Lineup with Programming From MTV Networks BET and CBS", Comcast Television, Apr. 8, 2004, pp. 1-3.
"DVR-810H-S", URL: https://pioneerelectronics.com/PUSA/Home?Blu-ray-Disc/Pioneer-DVD-Players/DVR-810H-S#specs, retrieved Jul. 27, 2022, pp. 1-3.
"HR10-250 DirectTV HD Tivo DVR Reviewed", Home Theater Review, Apr. 15, 2004. pp. 1-19.
Arlen, G., "AOLTV Tries to Leverage Online Audience into Hybrid Convergence, Battling Microsoft", URL: https://www.digitalbroadcasting.com/doc/aoltv-tries-to-leverage-online-audience-into-0001, Jul. 10, 2000, pp. 1-2.
"Facts about the Pioneer 810H", URL: https://tivopedia.com/model-pioneer-810h.php, retrieved Jul. 27, 2022, pp. 1-3.
Hogan, M., "AOL TV Sees Mid-July Launch for Interactive-Television Test", URL: https://nexttv.com/news/aoltv-sees-mid-july-launch-interactive-television-test-142758, Jun. 25, 2000, pp. 1-8.
"Comcast Reports Second Quarter 2004 Results", Comcast Investor, Jul. 28, 2004, pp. 1-9.
"DISHPlayer 500 Personal TV Remote Control", Microsoft webtv, Copyright 2000, pp. 1-36.
Lee, J., "Interactive TV is Finally Here, Sort Of", The New York Times, Apr. 4, 2002, pp. 1-5.
Deboer, C., "Humax Announces TiVo-Powered DRT-800 DVR and DVD Recorder", Udioholics Online A/V Magazine, Oct. 14, 2004, pp. 1-3.
"Features of the EchoStar's DISH Player", URL: www.dishretailer.com/psda/dishplay.htm, Retrieved: Jul. 27, 2022.
"TiVo Service Number and Model Number Table for Series 3 and earlier", URL: https://tivoidp.tivo.com/tivoCommunitySupport/article/TiVo-Service-Number-and-Model-Number-Table-for-Series-3-and-earlier, retrieved Jul. 27, 2022, pp. 1-6.
"Comcast 2004 Annual Report", Comcast, pp. 10-80.
"Comcast and Microsoft Announce Licensing Agreement for Microsoft TV Software", Comcast Corporate, May 20, 2004, pp. 1-3.
"Directv HD DVR User's Guide", DIRECTV, Copyright 1999, 2004 by TiVo Inc., pp. 1-175.
Falcone, J., "Humax DRT TiVo/DVD recorder review: Humax DRT TiVo/DVD recorder", CNET, Nov. 15, 2004, pp. 1-8.
Brown, M. et al., "The Dish That Does More", PC Magazine, Feb. 22, 2000, pp. 1-2.
"Comcast and Best Buy Expand Philadelphia Retail Program for HDTV and Digital Cable to New Markets", Comcast Corporate, Apr. 8, 2003, pp. 1-5.
"Comcast Reports Third Quarter 2004 Results", Comcast Investor, Oct. 27, 2004, pp. 1-7.
Falcone, J., "Toshiba SD-H400 (80-hour TiVo)", CNET, URL: https://www.cnet.com/reviews/toshiba-sd-h400-80-hour-tivo-preview/, Jun. 10, 2004, pp. 1-2.
"Digital Satellite Recorder User's Guide", DIRECTV, Copyright 1999, 2002 by TiVo Inc., pp. 1-164.
"DIRECTV DVR User's Guide", DIRECTV, Copyright 1999, 2002 by TiVo Inc., pp. 1-164.
"Pioneer DVD Recorder with TiVo User's Guide", Pioneer, Copyright 2003, pp. 1-174.
"Time Warner Cable's Full Service Network unveils new navigator", Business Wire, Apr. 30, 1996, pp. 1-6.

\* cited by examiner

LINEAR CONTENT OPERATION PANEL

FIG. 4

INTERACTIVE CONTENT OPERATION PANEL

| ITEM | CONTENTS |
|---|---|
| RECORD TIME DAY | 2005/7/7 |
| INFORMATION ON CONTENTS OF DATA BROADCAST | NEWS |
| APPRECIATION TERM | 2005/7/14 |
| VIEW HISTORY (IMAGE) | 80 % DONE |
| VIEW HISTORY (DATA BROADCAST) | NONE |

MULTIMEDIA PLAYER DISPLAYING OPERATION PANEL DEPENDING ON CONTENTS

CROSS REFERENCE TO RELATED APPLICATION

This is a continuation of U.S. application Ser. No. 18/138,178, filed Apr. 24, 2023, which is a continuation of U.S. application Ser. No. 17/868,139, filed Jul. 19, 2022, now U.S. Pat. No. 11,812,091, which is a continuation of U.S. application Ser. No. 15/670,155, filed Aug. 7, 2017, now U.S. Pat. No. 11,470,379, which is a continuation of U.S. application Ser. No. 15/287,074, filed Oct. 6, 2016, now U.S. Pat. No. 9,743,129, which is a continuation of U.S. application Ser. No. 13/443,955, filed Apr. 11, 2012, now U.S. Pat. No. 9,489,985, which is a continuation of U.S. application Ser. No. 11/508,209, filed Aug. 23, 2006, now U.S. Pat. No. 8,170,394. This application relates to and claims priority from Japanese Patent Application No. 2005-248576, filed on Aug. 30, 2005. The entirety of the contents and subject matter of all of the above is incorporated herein by reference.

BACKGROUND OF THE INVENTION

The present invention relates to image rendering techniques for an apparatus which reproduces digital contents multiplexing a plurality of contents having different information, and more particularly to image rendering techniques for reproduction control of digital contents by using user operation interfaces.

A conventional digital broadcasting compatible HOD/DVD decoder which is a digital content reproduction apparatus requires, in addition to channel tuning, reproduction control keys for linear contents such as video and audio, the keys including "reproduce", "stop", "fast forward", "fast backward", "temporary stop" and other operation keys. The apparatus further requires "up", "down", "right", "left", "decide" and four-color keys for operation control of data broadcasting. In order to deal with all functions, a number of remote keys are required. It takes learning time in order for a user master an operation method, or there is an issue of not easy to use.

As described in JP-A-2005-73022, there is known a broadcast receiving apparatus which provides a user with illumination of a usable key of a remote controller in accordance with information on digital contents. Typical apparatus which perform reproduction control by graphical user interface (GUI) digital include a digital broadcasting compatible personal computer and a DVD reproduction compatible personal computer. In these apparatus, reproduction keys for linear contents and interactive contents are displayed on a screen and unusable keys are disabled so that it is possible to improve user easy to use performance. However, in order to display all keys, a large panel rendering area is required. Since linear contents and interactive contents are multiplexed and transmitted for digital broadcasting, these contents are also recorded in a multiplexed state.

SUMMARY OF THE INVENTION

The apparatus described in JP-A-2005-73022 is required to mount all keys so that a remote controller having a large area is used. Similarly, the apparatus using GUI is also required to display all keys so that a wide operation panel rendering area is used.

Information on data added digital broadcasting includes up-to-date news, weather forecast and the like. There arises an issue of a lapse of an appreciation term, when reproduction is made.

It is therefore an object of the present invention to display automatically only usable operation keys in accordance with information on digital contents. Accordingly, a user operation learning time can be shortened, since the panel rendering area is made small, a mouse motion distance can be shortened, and an easy to use performance can be improved. It is an object of the present invention to provide a digital content reproduction apparatus capable of having a relatively large image display area by making small a panel rendering area. It is another object of the present invention to provide a digital content reproduction apparatus capable of reproduction within an appreciation term by monitoring information on digital contents.

According to the digital content reproduction apparatus of the present invention, a plurality of user operation interfaces of the same size are provided, information on digital contents is monitored, and upon occurrence of a change in the information, the user operation interfaces are automatically and exclusively displayed in the same panel rendering area so that only usable operation keys can be displayed. Information on digital contents is monitored and display is controlled in accordance with digital content attributes.

According to the present invention, a plurality of user operation interfaces of the same size are provided, information on digital contents is monitored, and upon occurrence of a change in the information, the user operation interfaces are automatically and exclusively displayed in the same panel rendering area so that only usable operation keys can be displayed and a user operation learning time can be shortened.

According to the present invention, since the panel rendering area is made small, a mouse motion distance can be shortened so that a user easy to use performance can be improved.

According to the present invention, since the panel rendering area is made small, the image display area can be made relatively large.

According to the present invention, only information within an appreciation term can be presented by controlling the display state in accordance with information on digital contents.

Other objects, features and advantages of the invention will become apparent from the following description of the embodiments of the invention taken in conjunction with the accompanying drawings.

DESCRIPTION OF THE EMBODIMENTS

Embodiments of the present invention will be described in detail with reference to the accompanying drawings.

Figure 1:
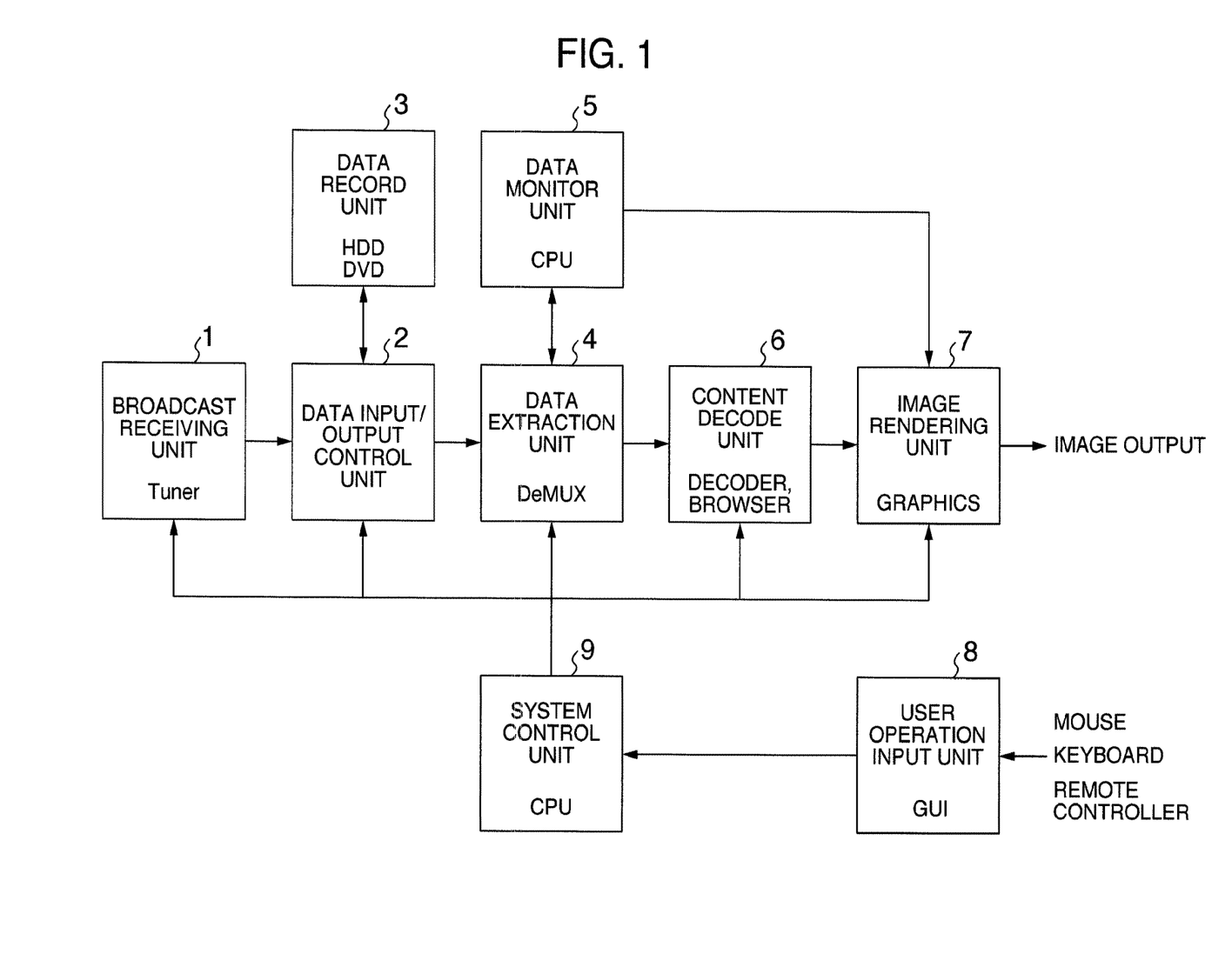
FIG. 1 is a diagram showing the structure of a digital content reproduction apparatus according to an embodiment of the present invention.

FIG. 1 is a diagram showing the structure of a digital content reproduction apparatus according to the embodiment of the present invention.

Referring to FIG. 1, the digital content reproduction apparatus records broadcast data received at a broadcast receiving unit 1 in a data record unit 3 with involvement of a data input/output control unit 2. The data input/output control unit 2 reads data from the data record unit 3 and supplies the read data via a data extraction (demultiplex) unit 4 to a content decode unit 6 which decodes the supplied data and sends the decoded data to an image rendering unit 7. A data monitor unit 5 always monitors information on digital contents in the data extraction unit 4, and in accordance with a change in the information, instructs the image rendering unit 7 to perform rendering of an user operation interface corresponding to the information on the contents. The decoded contents and the user operation interface are superposed and output as image data by the image rendering unit 7. A user input to the displayed user operation interface from a mouse, a keyboard or a remote controller is sent to a user operation input unit 8 which transfers the user operation information to a system control unit 9. In accordance with the user operation information, the system control unit 9 controls the broadcast receiving unit 1, data input/output control unit 2, data extraction unit 4, content decode unit 6 and image rendering unit 7.

Next, description will be made on the user operation interface during digital broadcast reproduction.

Figure 2:
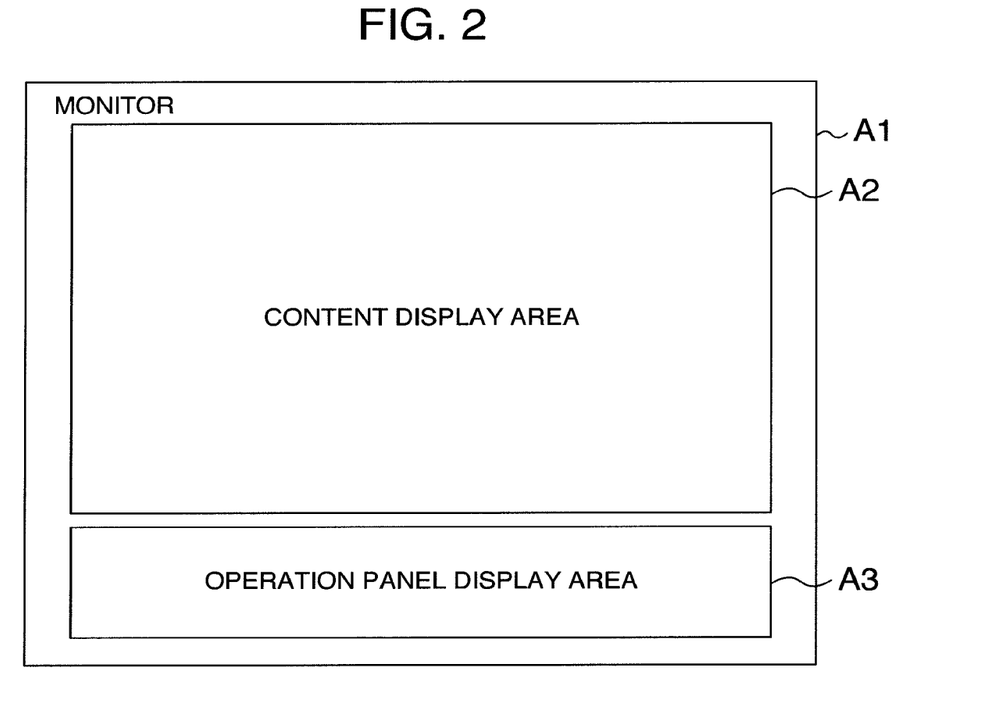
FIG. 2 is an illustrative diagram showing the layout of a screen of the apparatus shown in FIG. 1.
Figure 3:
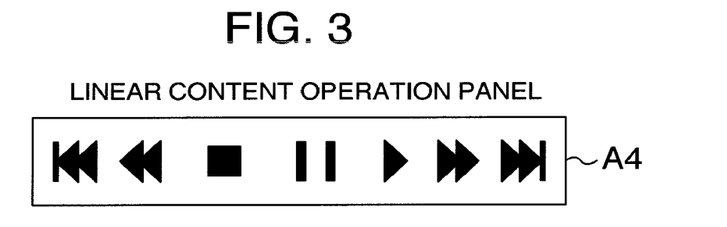
FIG. 3 is an illustrative diagram showing a linear content operation panel of the apparatus shown in FIG. 1.
Figure 4:
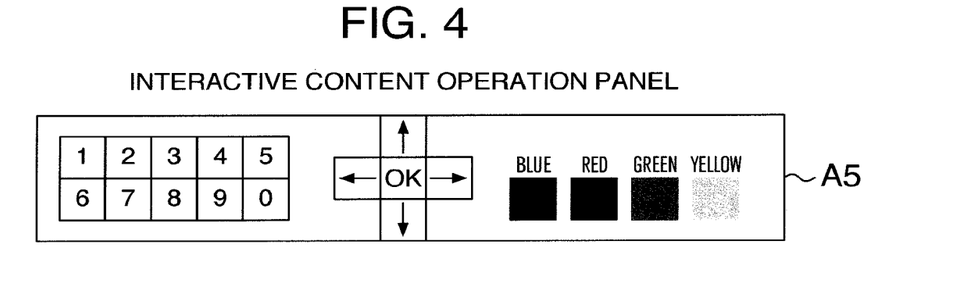
FIG. 4 is an illustrative diagram showing an interactive content operation panel of the apparatus shown in FIG. 1.

FIGS. 2 to 4 show image display states during digital broadcast reproduction. A monitor A1 has a content display area A2 and an operation panel display area A3. During reproduction of linear contents such as moving image contents, a linear content operation panel A4 is displayed in the operation panel display area A3, the linear content operation panel providing functions of reproduce, stop, temporary stop, fast forward, fast backward, previous skip, next skip and the like.

During reproduction of interactive contents such as data broadcast contents, an interactive content operation panel A5 is displayed in the operation panel display area A3, the interactive content operation panel providing functions of numerical keys from 0 to 9, up/down/right/left keys, a decide key, blue/red/green/yellow keys and other keys.

The linear content operation panel A4 and interactive content operation panel A5 are displayed exclusively and are not displayed at the same time. The functions provided by the linear content operation panel A4 and interactive content operation panel A5 are not limited to those described above, but the functions may be increased or decreased in accordance with the apparatus function.

Next, by taking Japanese terrestrial digital broadcasting as an example, description will be made on a specific digital content monitoring method.

TV type services, data broadcasting services and data added TV services are defined for Japanese terrestrial digital broadcasting (Association of Radio Industries and Businesses: Terrestrial Digital Television Broadcasting Operational Guideline TR-B14). Program specific information (PSI) on digital broadcasting contains a program map table (PMT). PMT contains a data encode descriptor which contains an auto_start_flag.

In data added TV services, if the auto_start_flag is "1", data broadcasting is automatically displayed, whereas if it is "0", data broadcasting is displayed upon instruction from a user. The data monitor unit monitors the auto_start_flag, and when the flag becomes "1", the interactive content operation panel A5 is displayed, and when the flat becomes "0", the linear content operation panel A4 is displayed.

In this embodiment, the linear content operation panel and interactive content operation panel are provided, information on digital contents is monitored, and upon occurrence of a change in the information, the panels are automatically and exclusively displayed in the operation panel display area A3 of the same panel rendering area size. Accordingly, only usable operation keys can be displayed, a user operation learning time can be shortened, since the panel rendering area is made small, a mouse motion distance can be shortened, and an easy to use performance can be improved. Further, since the panel rendering area is made small, the image display area can be made relatively large.

In this embodiment, although terrestrial digital broadcasting has been described, the embodiment is also used for reproduction of other digital contents. Also in this case, the operation panel can be switched automatically by monitoring the content switching flag.

Figure 5:
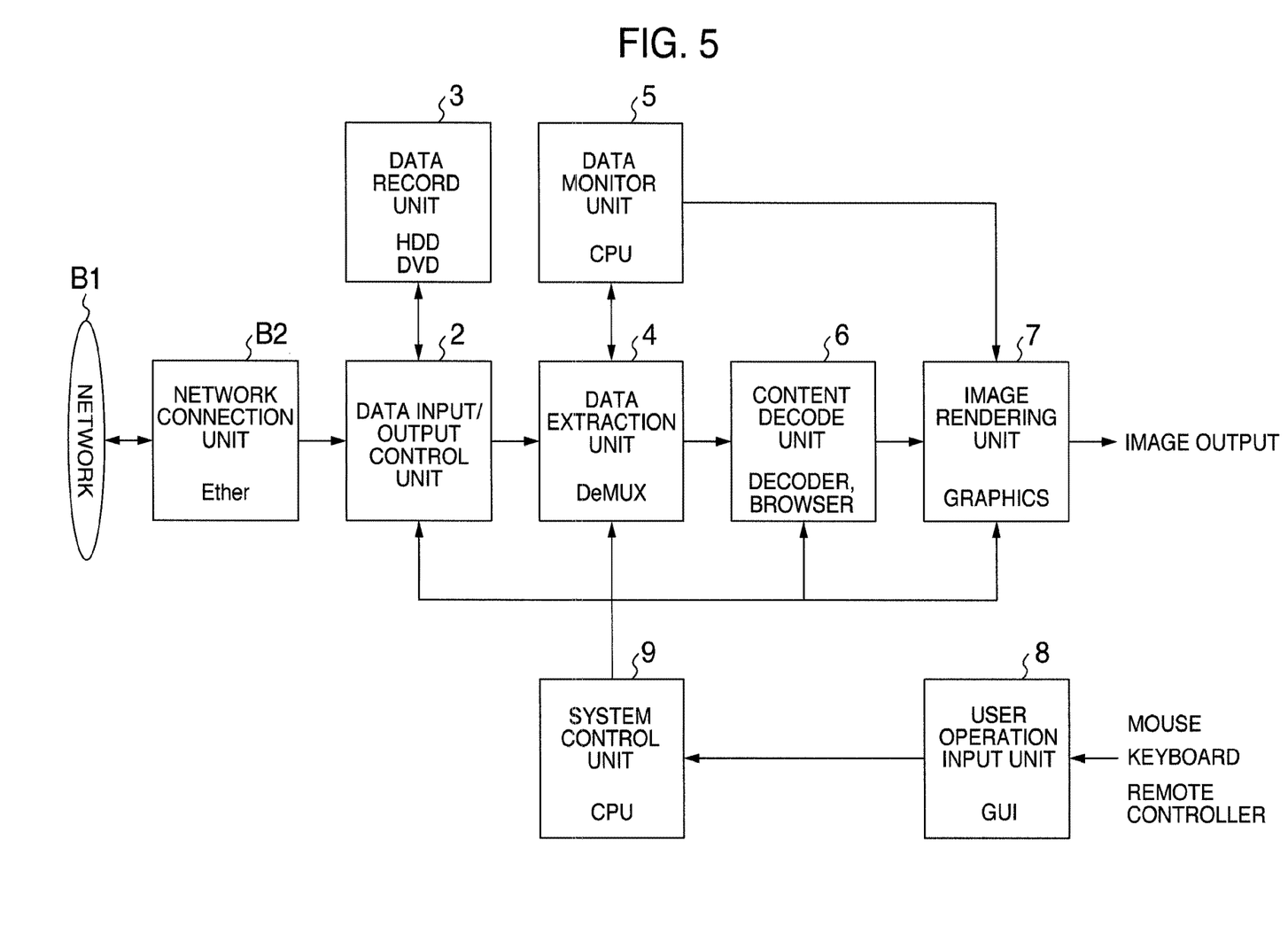
FIG. 5 is a diagram showing the structure of a digital content reproduction apparatus according to another embodiment of the present invention.

FIG. 5 is a diagram showing the structure of a digital content reproduction apparatus according to another embodiment of the present invention. Description will be made on only different points from the description described so far.

In the above description, although data is supplied to the apparatus by using broadcasting waves, in this embodiment, digital content services via a network B1 are assumed. In this case, data can be acquired via a network connection unit B2 connected to the network B1. The data input/output control unit 2 and other succeeding units are similar to those described above, and the description thereof is omitted.

Figure 6:
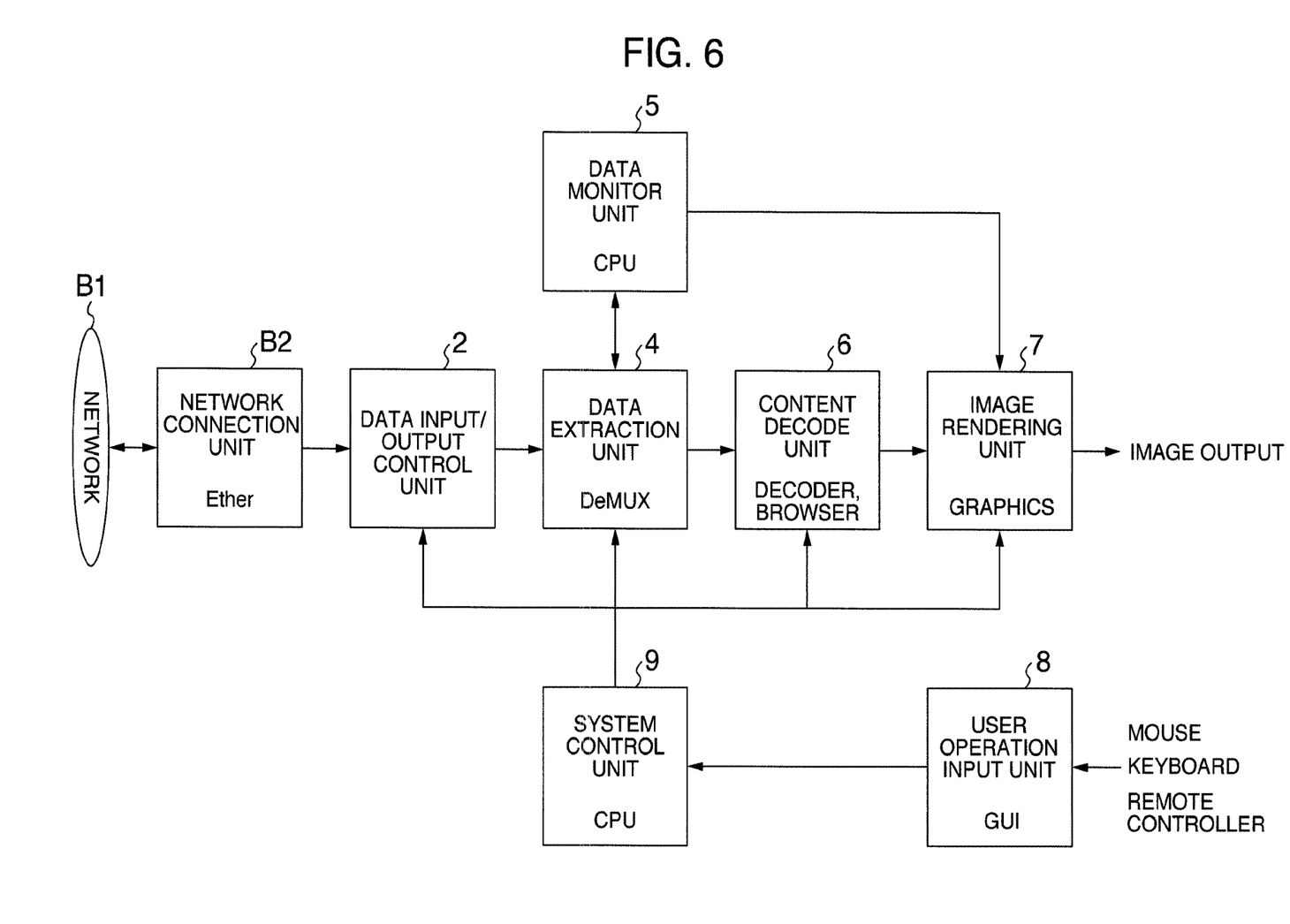
FIG. 6 is a diagram showing the structure of a digital content reproduction apparatus according to another embodiment of the present invention.

FIG. 6 is a diagram showing the structure of a digital content reproduction apparatus according to another embodiment of the present invention. Description will be made on only different points from the foregoing description.

In the foregoing description, although data acquired by the network connection unit B2 connected to the network B1 is recorded in the data record unit 3, in this embodiment, video on demand (VOD) type services are assumed and a data record unit is not provided in the reproduction apparatus. The data input/output unit 2 requests a VOD service center about necessary data via the network connection unit B2 and network B1. The data input/output control unit 2 and other succeeding units are similar to those described above, and the description thereof is omitted.

Figure 7:
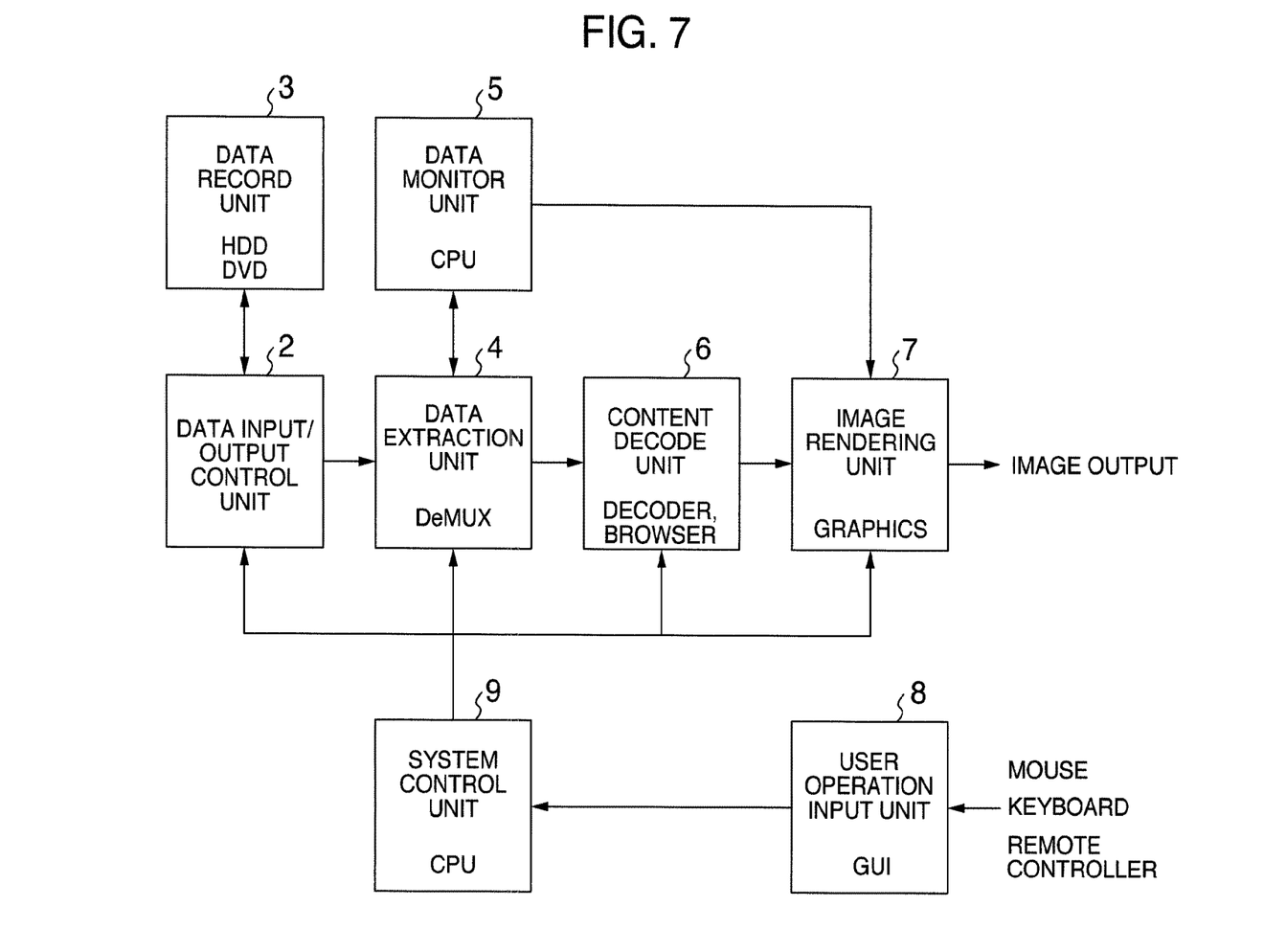
FIG. 7 is a diagram showing the structure of a digital content reproduction apparatus according to another embodiment of the present invention.

FIG. 7 is a diagram showing the structure of a digital content reproduction apparatus according to another embodiment of the present invention. Description will be made on only different points from the foregoing description.

In the foregoing description, although data acquired by using broadcasting waves is recorded in the data record unit 3, in this embodiment, the broadcast receiving unit 1 is not provided and only data recorded beforehand in the data record unit 3 is reproduced. This embodiment assumes an apparatus dedicated only to reproduction. The data input/output control unit 2 and other succeeding units are similar to those described above, and the description thereof is omitted.

Figure 8:
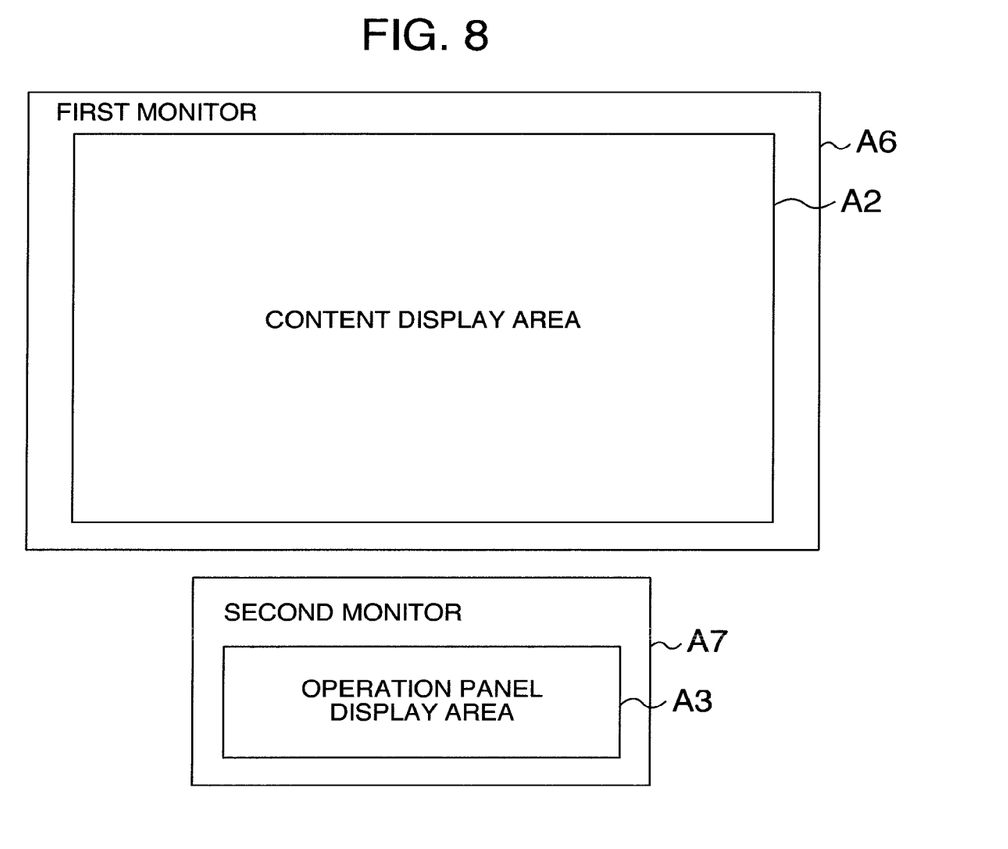
FIG. 8 is an illustrative diagram showing the layout of screens of the apparatus shown in FIG. 9.
Figure 9:
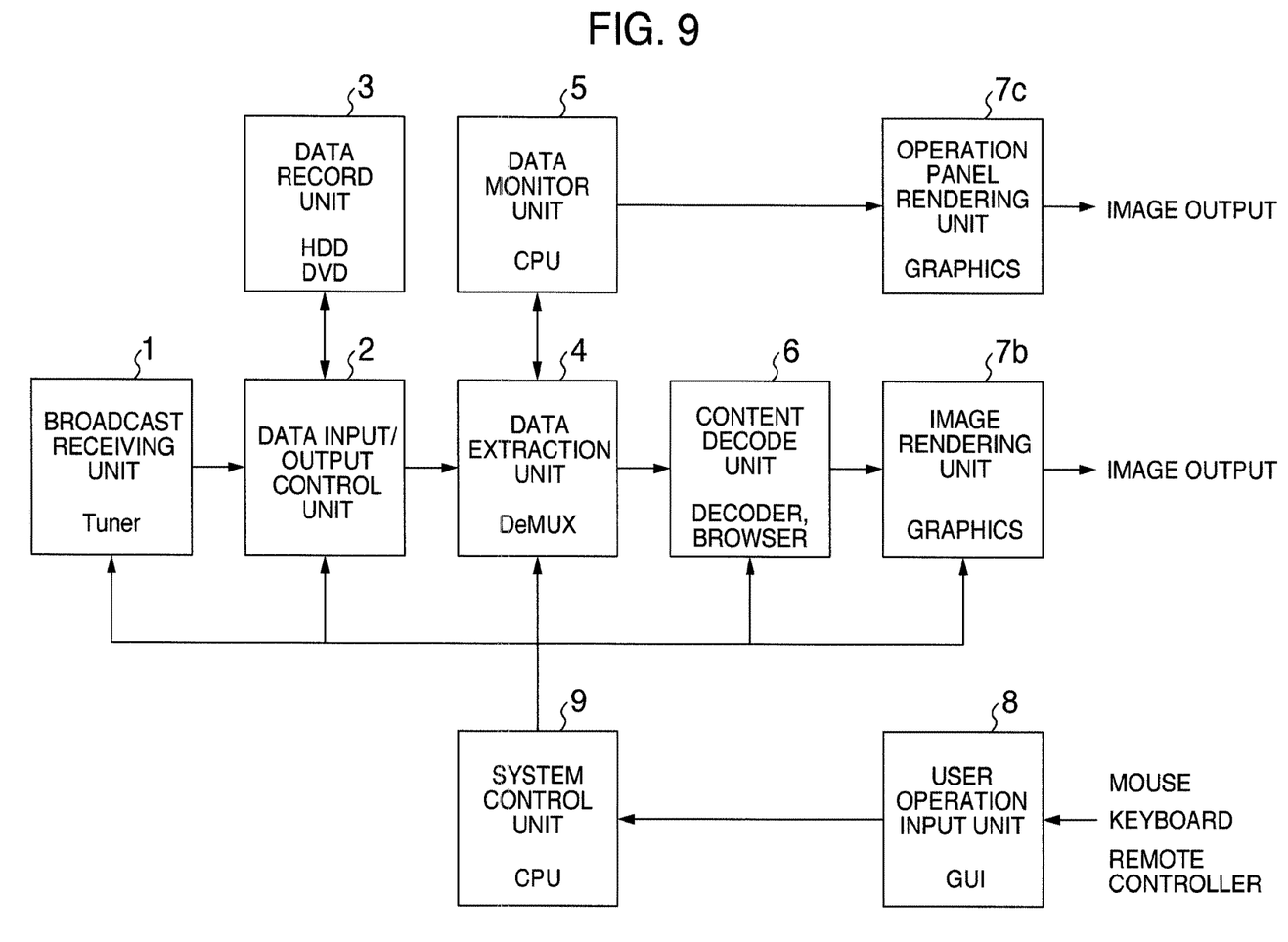
FIG. 9 is a diagram showing the structure of a digital content reproduction apparatus according to another embodiment of the present invention.

FIG. 8 is an illustrative diagram showing the layout of screens of the apparatus shown in FIG. 9. In the foregoing description, although a single monitor is used which has both the content display area and operation panel display area, in this embodiment, a first monitor A6 has a content display area A2 and a second monitor A7 has an operation panel display area A3. If a remote controller or the like has the operation panel display area A3, the number of keys of the remote controller can be reduced. FIG. 9 is a diagram showing the structure of the digital content reproduction apparatus of this embodiment.

Figure 10:
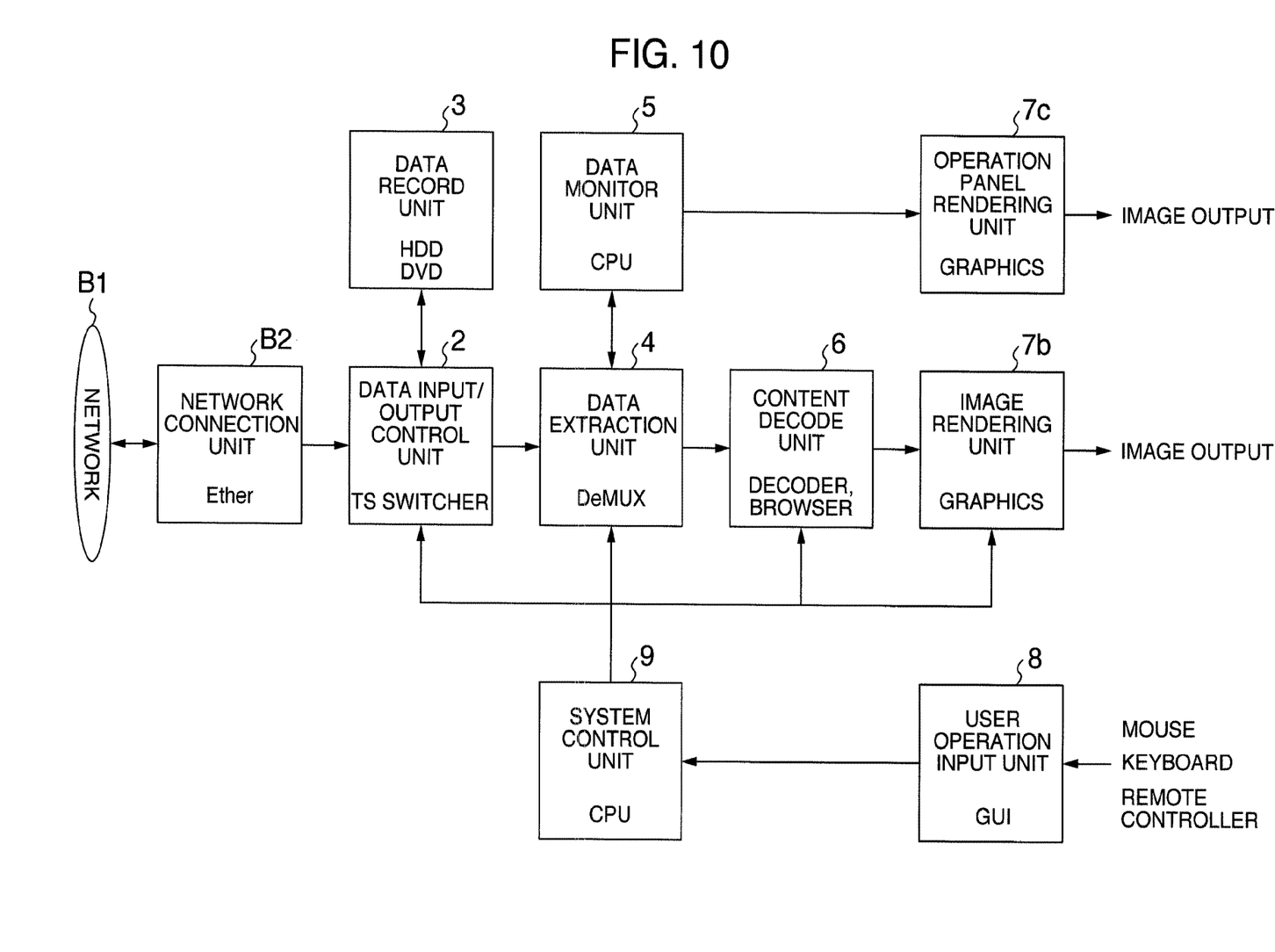
FIG. 10 is a diagram showing the structure of a digital content reproduction apparatus according to the embodiment of the present invention.
Figure 11:
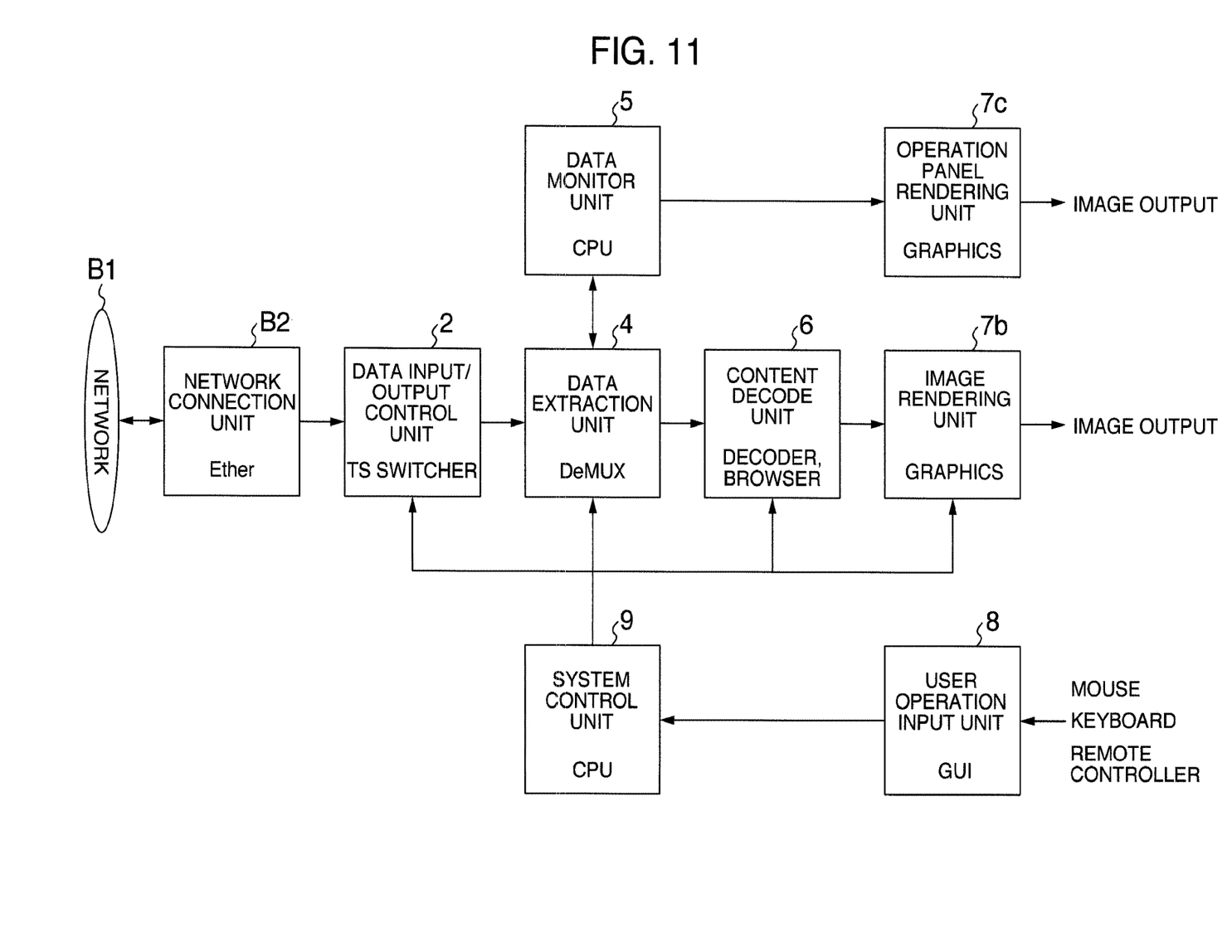
FIG. 11 is a diagram showing the structure of a digital content reproduction apparatus according to the embodiment of the present invention.
Figure 12:
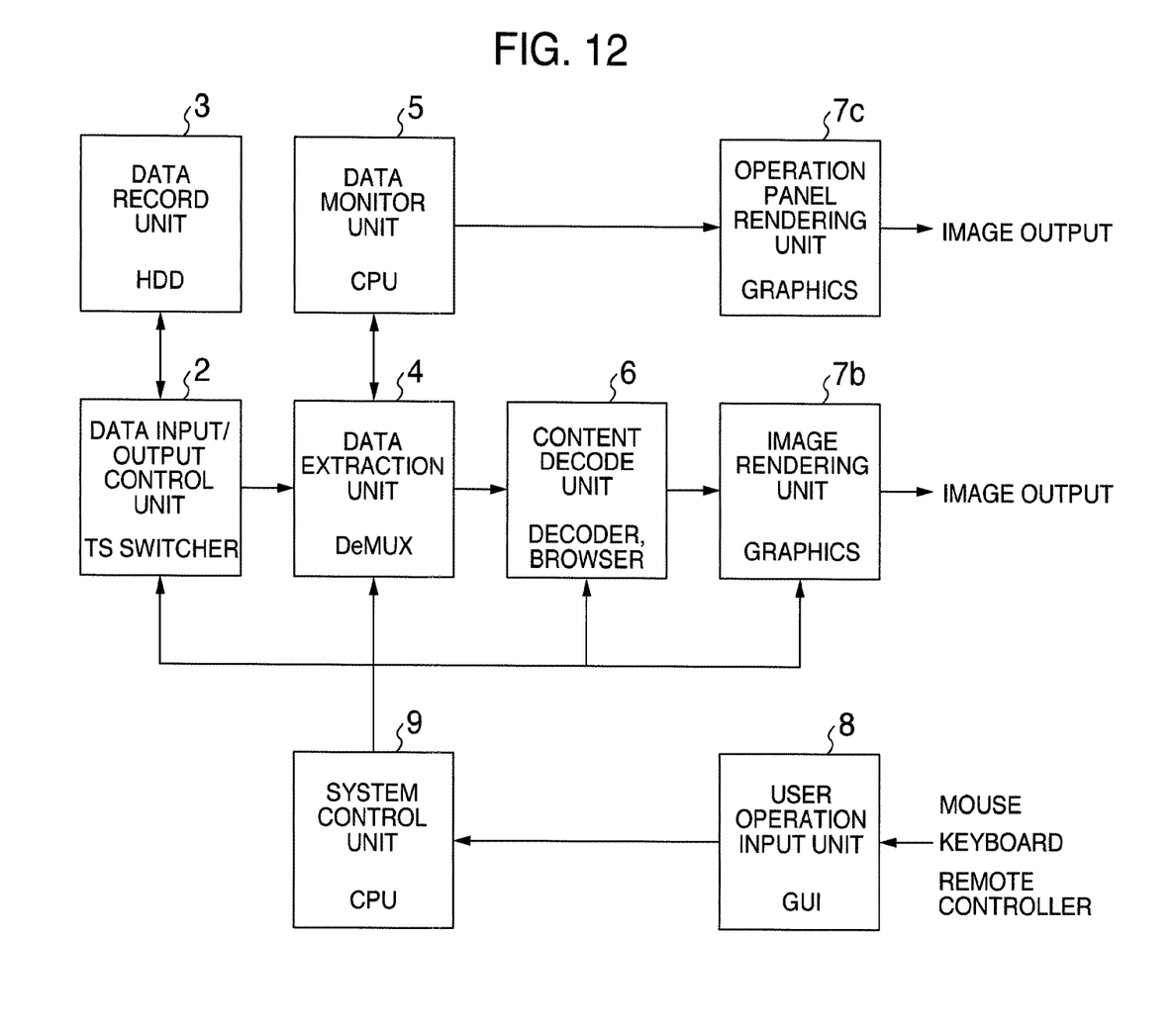
FIG. 12 is a diagram showing the structure of a digital content reproduction apparatus according to the embodiment of the present invention.

A different point from the foregoing description resides in that a content rendering unit 7b and an operation panel rendering unit 7c are independent. Other points are similar to the foregoing description, and the description thereof is omitted. FIGS. 10 to 12 show the structures that the content rendering unit 7b and operation panel rendering unit 7c are made independent as different from the foregoing description. Other points are similar to the foregoing description, and the description thereof is omitted.

FIGS. 10 to 12 are similar to those figures described above. In the foregoing description, although the data monitor unit monitors the auto_start_flag, in this embodiment, attributes of digital contents are recorded and a data broadcasting descriptive language BML (Broadcast Markup Language) is analyzed.

Figure 13:
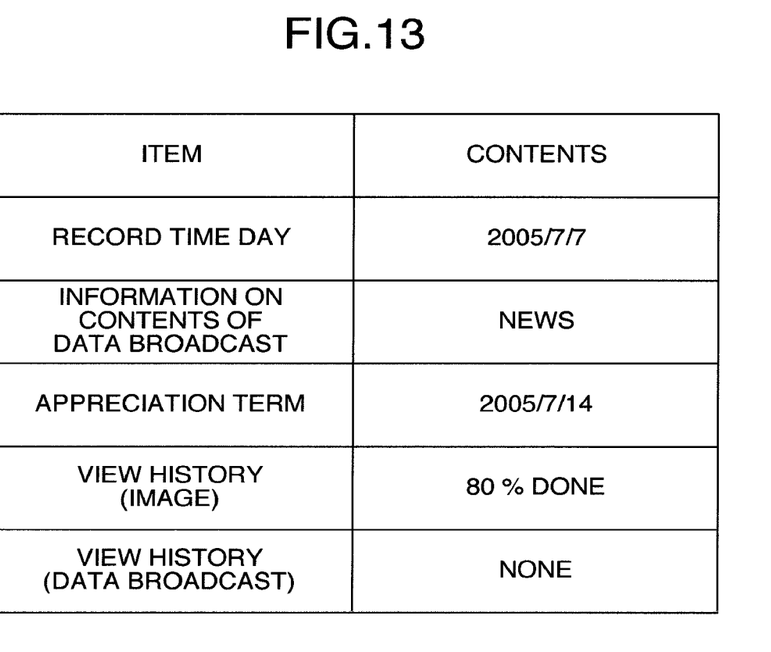
FIG. 13 is an illustrative diagram showing digital content attributes according to another embodiment of the present invention.

FIG. 13 shows examples of the attributes and language analysis results. Information on data added digital broadcasting includes up-to-date news, weather forecast and the like. These contents have a nature of an appreciation term and it is difficult to consider that these contents are referred to after, e.g., one month. In this embodiment, therefore, a content appreciation term is set beforehand in accordance with record days and times and information on the contents. If contents are outside the appreciation term, data broadcasting is not displayed even if the auto_start_flag is "1", but the linear content operation panel is displayed. If the contents are within the appreciation term and a user does not still view the contents, the data broadcasting is automatically displayed even if the auto_start_flag is "0" and the interactive content operation panel is displayed. Only new information can be presented for viewing, by controlling the display state in accordance with information on digital contents.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A digital content reproducing apparatus, comprising:
   a network connector configured to receive a digital content via a network,
   wherein the digital content is associated with attribute information including at least first attribute information that associates an appreciation term with the digital content and second attribute information corresponding to viewing history of the digital content;
   a demultiplexer configured to extract video signal from the digital content received by the network connector;
   a decoder configured to decode the video signal of the digital content extracted by the demultiplexer;
   a user operation receiver configured to receive a user operation for the digital content reproducing apparatus by a remote controller;
   a renderer configured to generate image data in which the decoded digital content and either a linear operation panel allowing user-instruction regarding linear reproduction functions of the decoded digital content or an interactive operation panel allowing user-instruction of interactive functions to an outside of the digital content reproducing apparatus are superimposed;
   a display configured to display the image data; and
   a controller configured to control alternative display of the linear operation panel and the interactive operation panel,
   wherein the linear operation panel and the interactive operation panel are distinct panels from each other, which are not generated by disabling of buttons and which are displayed with the same decoded digital content,
   wherein only one of the linear operation panel and the interactive operation panel is displayed exclusively at any given time, together with the decoded digital content,
   wherein the decoded digital content together with either the linear operation panel or the interactive operation panel, are displayed concurrently in one screen,
   wherein the digital content is decoded and displayed on the display when the appreciation term in the first attribute information has not lapsed,
   wherein the viewing history in the second attribute information provides an indication corresponding to an amount of the digital content that has been viewed, and
   wherein when the user operation receiver receives a user operation to request video on demand services, the network connector requests a digital content via the network.

2. The digital content reproducing apparatus according to claim 1,
   wherein buttons displayed on the linear operation panel and buttons displayed on the interactive operation panel are mutually different.

3. The digital content reproducing apparatus according to claim 2,
   wherein all of the buttons displayed on the linear operation panel and the buttons displayed on the interactive operation panel are usable buttons.

4. The digital content reproducing apparatus according to claim 1,
   wherein functions of buttons displayed on the linear operation panel and functions of buttons displayed on the interactive operation panel are mutually different.

5. The digital content reproducing apparatus according to claim 1,
wherein the linear operation panel and the interactive operation panel are displayed in a same panel rendering area of the display as an alternative operation panel.

6. The digital content reproducing apparatus according to claim 1,
wherein the controller is configured to control the alternative display of either of the linear operation panel or the interactive operation panel based at least in part on the attribute information.

7. The digital content reproducing apparatus according to claim 1,
wherein the linear operation panel and the interactive operation panel are common in size, and are alternatively switched between each other in a same panel rendering area of the display as an alternative operation panel.

8. The digital content reproducing apparatus according to claim 1,
wherein the controller is configured to control the alternative display to display the linear operation panel when the attribute information indicates the decoded digital contents are linear contents comprising moving image contents.

9. The digital content reproducing apparatus according to claim 1,
wherein the controller controls the alternative display based at least in part on the attribute information of the decoded digital contents in conjunction with a user operation.

10. A digital content reproducing method implemented on a digital content reproducing apparatus, comprising the steps of:
receiving a user operation to request video on demand services;
receiving a digital content via a network corresponding to the user operation,
wherein the digital content is associated with attribute information including at least first attribute information that associates an appreciation term with the digital content and second attribute information corresponding to viewing history of the digital content;
extracting video signals from the received digital content;
decoding the extracted video signals;
controlling alternative display of either of a linear operation panel allowing user-instruction regarding linear reproduction functions of the decoded digital content or an interactive operation panel allowing user-instruction of interactive functions to an outside of the digital content reproducing apparatus;
generating image data in which the decoded digital content and either the linear operation panel or the interactive operation panel are superimposed; and
displaying the image data on a display,
wherein the linear operation panel and the interactive operation panel are distinct panels from each other, which are not generated by disabling of buttons and which are displayed with the same decoded digital content,
wherein only one of the linear operation panel and the interactive operation panel is displayed exclusively at any given time, together with the decoded digital content,
wherein the decoded digital content together with either the linear operation panel or the interactive operation panel, are displayed concurrently in one screen,
wherein the digital content is decoded and displayed on the display when the appreciation term in the first attribute information has not lapsed, and
wherein the viewing history in the second attribute information provides an indication corresponding to an amount of the digital content that has been viewed.

11. The digital content reproducing method according to claim 10,
wherein buttons displayed on the linear operation panel and buttons displayed on the interactive operation panel are mutually different.

12. The digital content reproducing method according to claim 11,
wherein all of the buttons displayed on the linear operation panel and the buttons displayed on the interactive operation panel are usable buttons.

13. The digital content reproducing method according to claim 10,
wherein functions of buttons displayed on the linear operation panel and functions of buttons displayed on the interactive operation panel are mutually different.

14. The digital content reproducing method according to claim 10,
wherein the linear operation panel and the interactive operation panel are displayed in a same panel rendering area of the display as an alternative operation panel.

15. The digital content reproducing method according to claim 10,
wherein the alternative display of either of the linear operation panel or the interactive operation panel is controlled based at least in part on the attribute information.

16. The digital content reproducing method according to claim 10,
wherein the linear operation panel and the interactive operation panel are common in size, and are alternatively switched between each other in a same panel rendering area of the display as an alternative operation panel.

17. The digital content reproducing method according to claim 10,
wherein the alternative display is controlled to display the linear operation panel when the attribute information indicates the decoded digital contents are linear contents comprising moving image contents.

18. The digital content reproducing method according to claim 10,
wherein the alternative display is controlled based at least in part on the attribute information of the decoded digital content in conjunction with a user operation.

* * * * *